United States Patent
Kimata et al.

(10) Patent No.: US 9,278,687 B2
(45) Date of Patent: Mar. 8, 2016

(54) CONTROL DEVICE OF HYBRID VEHICLE

(71) Applicants: Kenta Kimata, Nagoya (JP); Masahiro Asai, Anjo (JP); Kazuhiko Motodohi, Anjo (JP); Shinichiro Iga, Okazaki (JP)

(72) Inventors: Kenta Kimata, Nagoya (JP); Masahiro Asai, Anjo (JP); Kazuhiko Motodohi, Anjo (JP); Shinichiro Iga, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 442 days.

(21) Appl. No.: 13/777,178

(22) Filed: Feb. 26, 2013

(65) Prior Publication Data

US 2013/0260955 A1  Oct. 3, 2013

(30) Foreign Application Priority Data

Mar. 29, 2012 (JP) .................. 2012-075787

(51) Int. Cl.
  *B60W 20/00*  (2006.01)
  *B60K 6/52*  (2007.10)
  *B60W 10/08*  (2006.01)
  *B60W 10/115*  (2012.01)
  *B60W 30/18*  (2012.01)

(52) U.S. Cl.
  CPC ............... *B60W 20/40* (2013.01); *B60K 6/52* (2013.01); *B60W 10/08* (2013.01); *B60W 10/115* (2013.01); *B60W 20/00* (2013.01); *B60W 30/18045* (2013.01); *Y02T 10/6265* (2013.01); *Y10S 903/902* (2013.01); *Y10T 477/23* (2015.01)

(58) Field of Classification Search
  None
  See application file for complete search history.

(56) References Cited

U.S. PATENT DOCUMENTS

2003/0019313 A1* 1/2003 Ibamoto et al. .................. 74/339
2010/0250075 A1  9/2010 Suzuki et al.

FOREIGN PATENT DOCUMENTS

| JP | A-2007-296869 | 11/2007 |
| JP | A-2009-51366 | 3/2009 |
| JP | A-2009-78754 | 4/2009 |
| JP | A-2010-180903 | 8/2010 |
| JP | A-2010-223399 | 10/2010 |
| JP | A-2011-37359 | 2/2011 |

OTHER PUBLICATIONS

Apr. 16, 2013 International Search Report issued in International Application No. PCT/JP2013/053158 (with translation).

* cited by examiner

*Primary Examiner* — Erin D Bishop
(74) *Attorney, Agent, or Firm* — Oliff PLC (57) ABSTRACT

A control device of a hybrid vehicle including an engine; an automatic transmission placed on a power transmission path between the engine and wheels, having a first friction engagement element engaged in a forward range and a second engagement element engaged in a reverse range based on a hydraulic pressure generated while the engine is stopped; and a rotary electric machine capable of driving the wheels without using the power transmission path. The rotary electric machine is driven when a shift range is the forward range or the reverse range while the internal combustion engine is stopped, and the driving of the rotary electric machine is restrained for a set time after the shift range is changed from the forward range to the reverse range or vice versa while the engine is stopped.

10 Claims, 9 Drawing Sheets

|   | C-1 | C-2 | C-3 | B-1 | B-2 | F-1 |
|---|---|---|---|---|---|---|
| P |   |   |   |   |   |   |
| REV |   |   | ○ |   | ○ |   |
| N |   |   |   |   |   |   |
| 1ST | ○ |   |   |   | (○) | ○ |
| 2ND | ○ |   |   | ○ |   |   |
| 3RD | ○ |   | ○ |   |   |   |
| 4TH | ○ | ○ |   |   |   |   |
| 5TH |   | ○ | ○ |   |   |   |
| 6TH |   | ○ |   | ○ |   |   |

※ (○): ENGINE BRAKE IN OPERATION

CONTROL DEVICE OF HYBRID VEHICLE

INCORPORATION BY REFERENCE

The disclosure of Japanese Patent Application No. 2012-075787 filed on Mar. 29, 2012 including the specification, drawings and abstract is incorporated herein by reference in its entirety.

BACKGROUND OF THE INVENTION

The present invention relates to control devices of hybrid vehicles such as an automobile, and more particularly to control devices of hybrid vehicles in which a rotary electric machine is capable of driving a wheel regardless of the engagement state of first and second friction engagement elements of an automatic transmission drivingly coupled to an internal combustion engine.

DESCRIPTION OF THE RELATED ART

In recent years, various hybrid vehicles have been developed in order to improve vehicle fuel economy, etc., and some of such hybrid vehicles include an automatic transmission that changes the speed of rotation of an internal combustion engine during hybrid driving or engine driving (see Japanese Patent Application Publication No. 2010-223399 (JP 2010-223399 A)).

In the hybrid vehicle including the automatic transmission as in JP 2010-223399 A, it is disclosed that during EV driving using only the driving force of a motor generator (hereinafter simply referred to as the "motor"), an electric oil pump provided for the automatic transmission is driven to generate a hydraulic pressure, and a specific one (e.g., clutch C-1) of a plurality of friction engagement elements forming a forward shift speed is engaged in a forward range to prepare for engine driving (prepare for formation of a shift speed).

SUMMARY OF THE INVENTION

In some automatic transmissions, a friction engagement element (e.g., brake B-2), which is different from a specific friction engagement element that is engaged in the forward range for preparation and which forms a reverse speed at a reverse range pressure that is output from a manual shift valve, is engaged when the shift range is changed to a reverse range, because of the structure of a hydraulic control device.

In the case where the EV driving as in JP 2010-223399 A is performed with such an automatic transmission, the friction engagement element (e.g., clutch C-1) engaged in the forward range for preparation is disengaged and the friction engagement element (e.g., brake B-2) forming the reverse speed is engaged when the shift range is changed from the forward range to the reverse range, and the friction engagement element forming the reverse speed is disengaged and the friction engagement element for preparation in the forward range is engaged when the shift range is changed from the reverse range to the forward range.

However, in the case where the driving force of the motor is output after, e.g., the shift range is quickly changed from the forward range to the reverse range or from the reverse range to the forward range by the driver (in particular, an accelerator is stepped on immediately after a foot brake is released), response of driving force output of the motor is made earlier than hydraulic disengagement of the engaged friction engagement element. Accordingly, the friction engagement element engaged in the forward range for preparation or the friction engagement element forming the reverse speed may not be disengaged in time. In particular, in the automatic transmission that forms a predetermined shift speed (e.g., first forward speed) in the state where both the friction engagement element engaged in the forward range for preparation and the friction engagement element forming the reverse speed are engaged, power transmission with the internal combustion engine is reduced by a torque converter, etc., but drag of the friction engagement element may occur, so that power is transmitted to an input shaft by the driving force of the motor. This may adversely affect durability of the friction engagement element whose disengagement is delayed with respect to the driving force output of the motor.

It is an object of the present invention to provide a control device of a hybrid vehicle which is capable of preventing drag of a friction engagement element when the shift range is changed from a forward range to a reverse range or from the reverse range to the forward range while an internal combustion engine is stopped.

According to an aspect of the present invention (see, e.g., FIGS. 1 to 9), a control device of a hybrid vehicle includes: an internal combustion engine; an automatic transmission placed on a power transmission path between the internal combustion engine and a wheel, having a first friction engagement element and a second engagement element which are engaged in a forward range and a reverse range, respectively, based on a hydraulic pressure generated by an electric oil pump that is driven while the internal combustion engine is stopped, and forming a predetermined shift speed (e.g., first forward speed) when the first and second friction engagement elements are simultaneously engaged; a rotary electric machine capable of driving the wheel without using the power transmission path; a shift range determining unit that determines a shift range; a rotary electric machine control unit that drives the rotary electric machine when the shift range is the forward range or the reverse range while the internal combustion engine is stopped; and an upon-change restraining unit that restrains driving of the rotary electric machine by the rotary electric machine control unit for a set time after the shift range is changed from the forward range to the reverse range or from the reverse range to the forward range while the internal combustion engine is stopped.

Thus, the upon-change restraining unit restrains driving of the rotary electric machine by the rotary electric machine control unit for the set time after the shift range is changed from the forward range to the reverse range or from the reverse range to the forward range while the internal combustion engine is stopped (i.e., EV driving mode). This can prevent drag of the first friction engagement element or the second friction engagement element when the shift range is changed from the forward range to the reverse range or from the reverse range to the forward range, whereby durability of the first friction engagement element and the second friction engagement element can be improved.

The control device of a hybrid vehicle according to the aspect (see, e.g., FIGS. 4 to 6) may further include an oil temperature detecting unit that detects an oil temperature in the automatic transmission, and in the control device of a hybrid vehicle, the upon-change restraining unit may increase the set time as the oil temperature is lower.

Thus, the upon-change restraining unit increases the set time during which start of driving of the rotary electric machine is restrained, as the oil temperature is lower. This allows driving of the rotary electric machine to be started at appropriate timing according to the oil temperature. Accordingly, particularly when the oil temperature is low, drag of the first friction engagement element or the second friction engagement element can be prevented even if disengagement of the first friction engagement element or the second friction engagement element is delayed due to oil viscosity. When the oil temperature is high, the first friction engagement element or the second friction engagement element is disengaged earlier, and thus starting of the vehicle is prevented from being restrained for an unnecessarily long time, which can reduce discomfort to the driver.

In the control device of a hybrid vehicle according to the aspect (see, e.g., FIGS. 4, 5, and 7), the rotary electric machine control unit may perform rotational speed control until at least a predetermined rotational speed is obtained at start of driving of the rotary electric machine, and the upon-change restraining unit may learn length of the set time for next control, based on a degree to which output torque of the rotary electric machine increases after elapse of the set time.

Thus, the upon-change restraining unit learns the length of the set time for the next control, based on the degree to which the output torque of the rotary electric machine increases after the elapse of the set time during which the start of driving of the rotary electric machine is restrained. Accordingly, particularly when the output torque becomes higher than that in a normal state due to drag of the first friction engagement element or the second friction engagement element, the set time for the next control is increased, and drag of the first friction engagement element or the second friction engagement element can be prevented in the next control.

In the control device of a hybrid vehicle according to the aspect (see, e.g., FIGS. 4, 5, and 8), the rotary electric machine control unit may perform rotational speed control until at least a predetermined rotational speed is obtained at start of driving of the rotary electric machine, and the upon-change restraining unit may learn to suppress a degree to which output torque of the rotary electric machine increases in next control, based on a degree to which the output torque of the rotary electric machine increases after elapse of the set time.

Thus, the upon-change restraining unit learns to suppress the degree to which the output torque of the rotary electric machine increases in the next control, based on the degree to which the output torque of the rotary electric machine increases after the elapse of the set time. Accordingly, particularly when the output torque becomes higher than that in a normal state due to drag of the first friction engagement element or the second friction engagement element, the degree to which the output torque of the rotary electric machine increases after the elapse of the set time in the next control is reduced, and drag of the first friction engagement element or the second friction engagement element can be reduced in the next control.

The control device of a hybrid vehicle according to the aspect (see, e.g., FIGS. 4 to 8) may further include: an accelerator-operation-amount detecting unit that detects an accelerator operation amount, and in the control device of a hybrid vehicle, the rotary electric machine control unit may control driving of the rotary electric machine based on the accelerator operation amount, and the upon-change restraining unit may restrain start of driving of the rotary electric machine by the rotary electric machine control unit regardless of the accelerator operation amount.

Thus, the rotary electric machine control unit controls driving of the rotary electric machine based on the accelerator operation amount. Accordingly, if the shift range is changed from the forward range to the reverse range or from the reverse range to the forward range, and the accelerator is on, the rotary electric machine control unit attempts to drive the rotary electric machine according to the accelerator operation amount. However, since the upon-change restraining unit restrains the start of driving of the rotary electric machine by the rotary electric machine control unit regardless of the accelerator operation amount, drag of the first friction engagement element or the second friction engagement element can be prevented.

DETAILED DESCRIPTION OF THE EMBODIMENTS

An embodiment of the present invention will be described below with reference to FIGS. 1 to 9. First, an example of a hybrid vehicle that can provide the present invention will be described with reference to FIG. 1.

Figure 1:
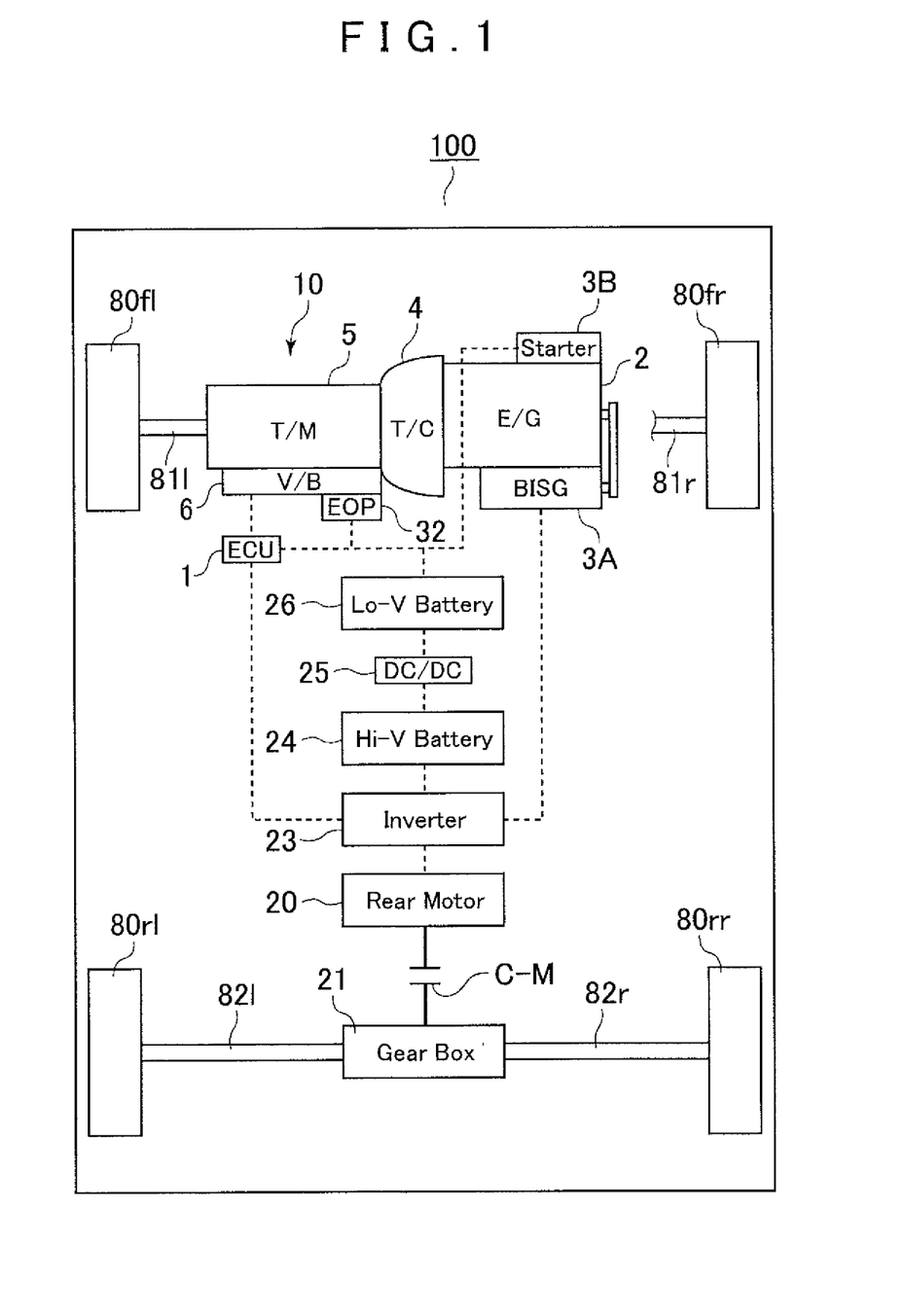
FIG. 1 is a schematic diagram showing a hybrid vehicle to which the present invention can be applied.

As shown in FIG. 1, a hybrid vehicle 100 according to the present embodiment is a rear motor hybrid vehicle, and is configured as a so-called front engine front drive (FF) vehicle in which an internal combustion engine (E/G) 2 is mounted on the front side of the vehicle and a hybrid vehicle automatic transmission (hereinafter simply referred to as the "automatic transmission") 10 is mounted on a transmission path between the internal combustion engine 2 and left and right front wheels 80*fl*, 80*fr*. The hybrid vehicle 100 includes a rear motor (rotary electric machine) 20 that is drivingly coupled to left and right rear wheels 80*rl*, 80*rr*. That is, the hybrid vehicle 100 is configured to be able to driven by the front wheels during engine driving, driven by the rear wheels during EV driving, and driven by the four wheels during hybrid driving.

More specifically, a belt integrated starter generator (BISG) 3A is connected to the internal combustion engine 2, so that the internal combustion engine 2 can be started as necessary. The belt integrated starter generator (BISG) 3A is supplied with electric power from a high voltage battery (Hi-V Battery) 24 via an inverter 23, so that the internal combustion engine 2 can started with high output, and that the high voltage battery 24 can be charged during operation (driving) of the internal combustion engine 2.

A starter 3B is a starter that is driven by a commonly used low voltage battery (Lo-V Battery) 26 (so-called 12V power source). In the hybrid vehicle 100, at normal temperature (e.g., 0 degrees or higher), the internal combustion engine 2 is ignited after the rotational speed of the internal combustion engine 2 is increased to a speed higher than the idling speed by using the belt integrated starter generator (BISG) 3A. At low temperature (e.g., lower than 0 degrees), the internal combustion engine 2 is started in a normal manner by using the starter 3B.

The automatic transmission 10, which is described in detail below, is connected to the internal combustion engine 2. The automatic transmission 10 generally includes a torque converter (T/C) 4, an automatic speed change mechanism (T/M) 5, a hydraulic control device (V/B) 6, etc. The torque converter 4 is drivingly coupled to the internal combustion engine 2. The automatic speed change mechanism (T/M) 5 is drivingly coupled to the torque converter 4, and the automatic speed change mechanism 5 is connected to left and right axles 81*l*, 81*r* via a differential unit D (see FIG. 2) as described in detail below, and is drivingly coupled to the left and right front wheels 80*fl*, 80*fr*.

The automatic speed change mechanism 5 is provided with the hydraulic control device (V/B) 6 that hydraulically controls friction engagement elements for shifting (a clutch and a brake) described below. In the hydraulic control device 6, a solenoid valve, etc. contained therein is electronically controlled based on an electronic command from a control unit (electronic control unit (ECU)) (control device of the hybrid vehicle) 1. The hydraulic control device 6 is provided with an electric oil pump 32 that is driven independently of the internal combustion engine 2 as described in detail below (i.e., that can be driven while a mechanical oil pump 31 is stopped), so that a hydraulic pressure can be supplied from the electric oil pump 32 to the hydraulic control device 6. That is, an engagement pressure that is supplied to each hydraulic servo of the friction engagement elements for shifting is regulated as desired by the hydraulic control device 6, based on the hydraulic pressure that is generated by the electric oil pump 32 and the mechanical oil pump 31 (see FIG. 9).

The electric oil pump 32 and the control unit 1 are driven by using electric power of the low voltage battery 26. The low voltage battery 26 is connected to the high voltage battery 24 via a DC/DC converter (step-down converter circuit) 25 so as to be supplied with electric power from the high voltage battery 24.

On the other hand, the rear motor 20 is connected to the high voltage battery 24 via the inverter 23, and is configured to be able to perform power running and regeneration by electric power control of the inverter 23 based on a drive command from the control unit 1. The rear motor 20 is drivingly coupled to a gear box 21 via a motor separation clutch C-M. The gear box 21 contains a speed reduction gear mechanism having a predetermined speed reduction ratio and a differential unit, which are not shown. When the motor separation clutch C-M is engaged, rotation of the rear motor 20 is reduced in speed by the speed reduction gear mechanism of the gear box 21 and differential rotation between left and right axles 82*l*, 82*r* is absorbed by the differential unit, so that the resultant rotation of the rear motor 20 is transmitted to the left and right rear wheels 80*rl*, 80*rr*. That is, the rear motor 20 is capable of driving the wheels 80*rl*, 80*rr* without using a power transmission path L (see FIG. 2) from the internal combustion engine 2 to the left and right front wheels 80*fl*, 80*fr* via the automatic transmission 10.

Figure 2:
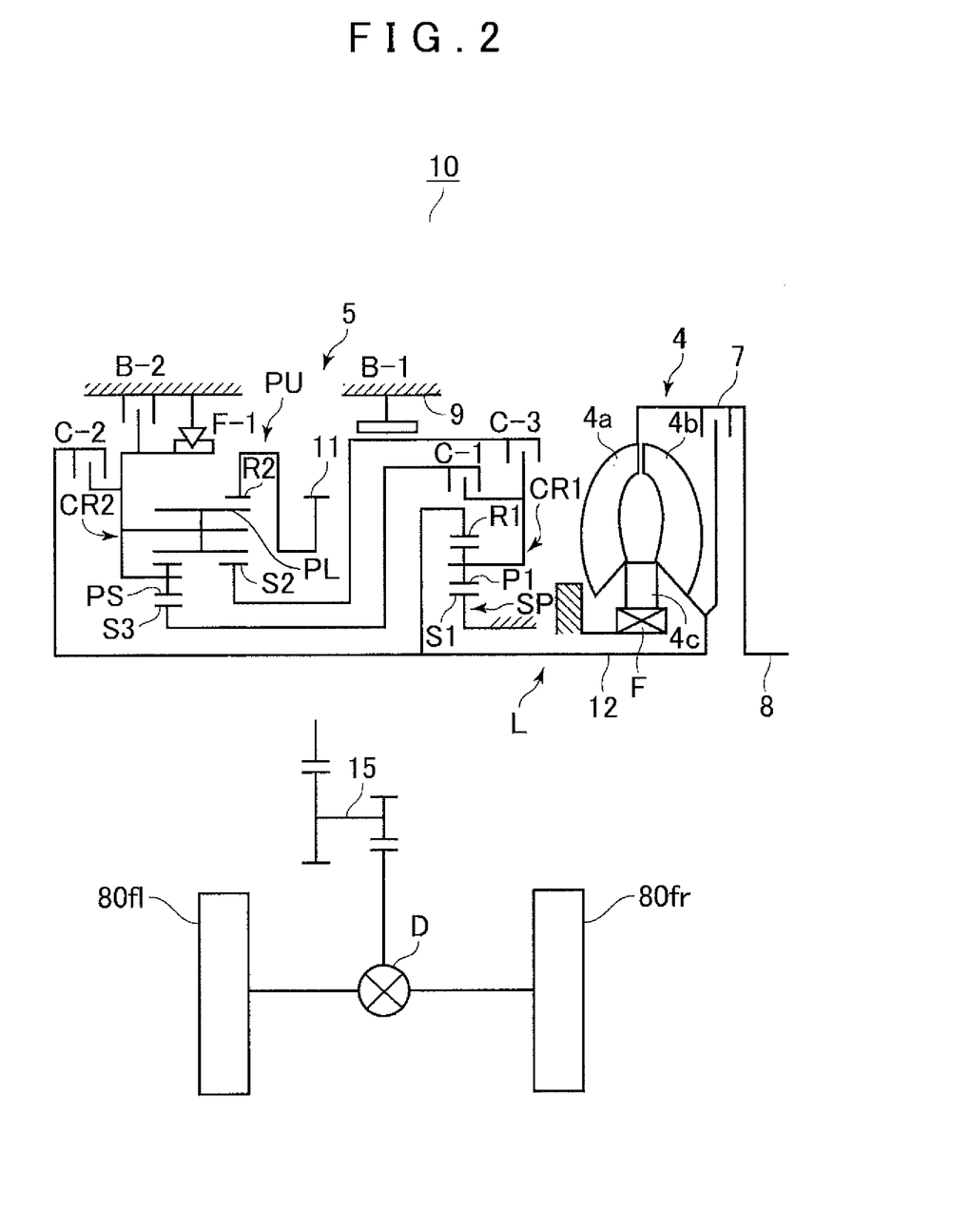
FIG. 2 is a skeleton diagram showing an automatic transmission.
Figure 3:
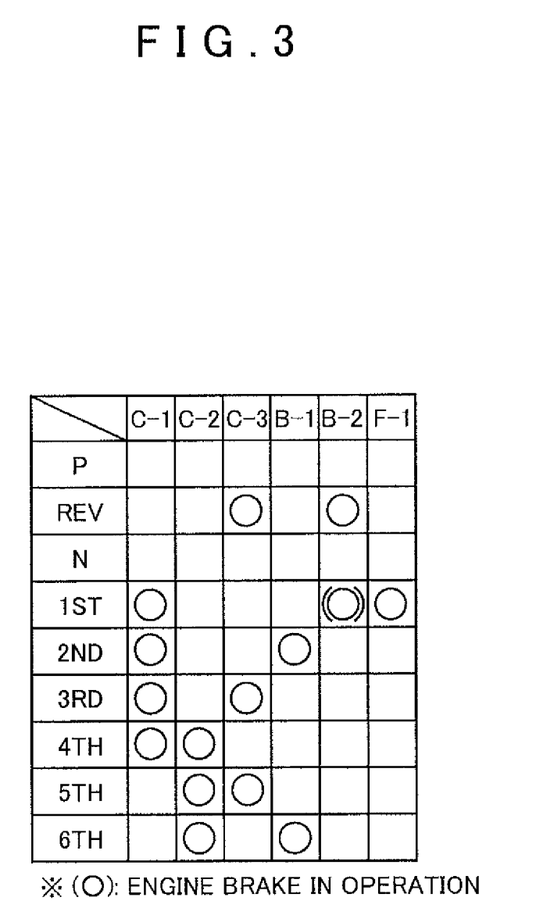
FIG. 3 is an engagement table of the automatic transmission.

The configuration of the automatic transmission 10 will be described below with reference to FIG. 2. The automatic transmission 10 is placed on the power transmission path L between the internal combustion engine 2 (see FIG. 1) and the left and right front wheels 80*fl*, 80*fr*, and has an automatic transmission input shaft 8 that can be connected to a crankshaft of the internal combustion engine 2. The automatic transmission 10 includes the torque converter 4 and the automatic speed change mechanism 5 which are placed around the axial direction of the input shaft 8.

The torque converter 4 has a pump impeller 4*a* connected to the input shaft 8 of the automatic transmission 10, a turbine runner 4*b* to which rotation of the pump impeller 4*a* is transmitted via working fluid, and a stator 4*c* that straightens the oil flow from the turbine runner 4*b* back to the pump impeller 4*a* and provides a torque increasing function. The turbine runner 4*b* is connected to an input shaft (input member) 12 of the automatic speed change mechanism 5 which is placed coaxially with the input shaft 8. The torque converter 4 is provided with a lockup clutch 7. When the lockup clutch 7 is engaged, rotation of the input shaft 8 of the automatic transmission 10 is directly transmitted to the input shaft 12 of the automatic speed change mechanism 5.

In the state where rotation of the turbine runner 4*b* is slower than that of the pump impeller 4*a*, the stator 4*c* is fixed so as not to be rotated by a one-way clutch F, and receives a reaction force of the oil flow to provide a torque increasing function. In the state where rotation of the turbine runner 4*b* is faster than that of the pump impeller 4*a*, the stator 4*c* runs idle so that the oil flow is not directed in the negative direction.

The automatic speed change mechanism side of the pump impeller 4*a* is drivingly coupled to the mechanical oil pump 31 (see FIG. 9) placed in a partition wall fixed to a transmission case 9. That is, the mechanical oil pump 31 is drivingly coupled to the pump impeller 4*a* of the torque converter 4 so as to operate with the internal combustion engine 2 via the input shaft 8.

The automatic speed change mechanism 5 includes a planetary gear SP and a planetary gear unit PU on the input shaft 12. The planetary gear SP is a so-called single-pinion planetary gear that includes a sun gear S1, a carrier CR1, and a ring gear R1, and the carrier CR1 has a pinion P1 meshing with the sun gear S1 and the ring gear R1.

The planetary gear unit PU is a so-called Ravigneaux type planetary gear that has a sun gear S2, a sun gear S3, a carrier CR2, and a ring gear R2 as four rotary elements, and the carrier CR2 has a long pinion PL meshing with the sun gear S2 and the ring gear R2 and a short pinion PS meshing with the sun gear S3, such that the long pinion PL meshes with the short pinion PS.

The sun gear S1 of the planetary gear SP is integrally fixed to the transmission case 9 so as no to be rotatable. The ring gear R1 makes the same rotation (hereinafter referred to as the "input rotation") as that of the input shaft 12. Moreover, the carrier CR1 makes decelerated rotation that is decelerated from the input rotation by the sun gear S1 which is fixed and the ring gear R1 making the input rotation, and is connected to a clutch (first friction engagement element) C-1 and a clutch C-3.

The sun gear S2 of the planetary gear unit PU is connected to a brake B-1 formed by a band brake, and is selectively fixed to the transmission case 9. The sun gear S2 of the planetary gear unit PU is also connected to the clutch C-3, so that the sun gear S2 selectively receives the decelerated rotation of the carrier CR1 via the clutch C-3. The sun gear S3 is connected to the clutch C-1, so that the sun gear S3 selectively receives the decelerated rotation of the carrier CR1.

Moreover, the carrier CR2 is connected to a clutch C-2 that receives the rotation of the input shaft 12, so that the carrier CR2 selectively receives the input rotation via the clutch C-2. The carrier CR2 is also connected to a one-way clutch F-1 and a brake (second friction engagement element) B-2, so that rotation of the carrier CR2 in one direction with respect to the transmission case 9 is restricted via the one-way clutch F-1, and so that the carrier CR2 is selectively fixed via the brake B-2. The ring gear R2 is connected to a counter gear 11, and the counter gear 11 is connected to the wheels 80*fl*, 80*fr* via a countershaft 15 and the differential unit D.

In the hybrid vehicle 100 configured as described above, during the engine driving using the driving force of the internal combustion engine 2, the motor separation clutch C-M shown in FIG. 1 is disengaged to separate the rear motor 20 from the wheels 80*rl*, 80*rr*. In the automatic transmission 10, the hydraulic control device 6 is electronically controlled by determining an optimal shift speed by the control unit 1 according to the shift range (shift position), the vehicle speed, and the accelerator operation amount, and the speed of the driving force of the internal combustion engine 2 is changed by one of first to sixth forward speeds and a reverse speed that are formed based on the determination of the shift speed. Thus, the driving force of the internal combustion engine 2 is transmitted to the wheels 80*rl*, 80*fr*. As shown in the operation table of FIG. 3, the first to sixth forward speeds and the reverse speed of the automatic transmission 10 are attained by changing the rotation transmission state of the automatic speed change mechanism 5 by operating (engagement controlling) the clutches C-1 to C-3, the brakes B-1, B-2, and the one-way clutch F-1.

When the driving mode is switched from the engine driving mode to the hybrid driving, the motor separation clutch C-M shown in FIG. 1 is engaged to drivingly couple the rear motor 20 to the wheels 80*rl*, 80*rr*. Thus, in addition to the driving force of the internal combustion engine 2, the driving force of the rear motor 20 is used assistively or for regeneration as appropriate based on the accelerator operation amount (driving force request from the driver). Namely, the hybrid vehicle 100 runs by using the driving force of the internal combustion engine 2 and the driving force of the rear motor 20.

During acceleration during the engine driving mode using the driving force of the internal combustion engine 2, etc., the motor separation clutch C-M may be disengaged to separate the rear motor 20 from the wheels 80*rl*, 80*rr* so as not to cause a travel resistance. Even during the engine driving, it is more preferable to engage the motor separation clutch C-M during deceleration so that the rear motor 20 performs regenerative braking, thereby the fuel efficiency is improved.

During the EV driving mode in which the shift position is the forward range, the motor separation clutch C-M shown in FIG. 1 is engaged to drivingly couple the rear motor 20 to the wheels 80*rl*, 80*a*, the internal combustion engine 2 is stopped, and the clutches C-2, C-3 and the brakes B-1, B-2 of the automatic transmission 10 are controlled to be disengaged, so that a neutral state is attained where the automatic transmission 10 can run idle. Thus, the driving force of the rear motor 20 is used for power running or regeneration as appropriate based on the accelerator operation amount (driving force request from the driver). Namely, the hybrid vehicle 100 runs forward by using only the driving force of the rear motor 20.

During the EV driving mode in which the shift position is the reverse range, the motor separation clutch C-M is engaged to drivingly couple the rear motor 20 to the wheels 80*rl*, 80*rr*, the internal combustion engine 2 is stopped, and the clutches C-1 to C-3 and the brake B-1 of the automatic transmission 10 are controlled to be disengaged, so that the neutral state is attained where the automatic transmission 10 can run idle. Thus, the driving force of the rear motor 20 is used for power running or regeneration as appropriate based on the accelerator operation amount (driving force request from the driver). Namely, the hybrid vehicle 100 runs rearward by using only the driving force of the rear motor 20.

During this EV driving, the members drivingly coupled to the wheels 80*fl*, 80*fr* of the automatic speed change mechanism 5 (e.g., the differential unit D, the countershaft 15, the counter gear 11, the gears of the planetary gear unit PU, etc.) are rotated together with the wheels 80*fl*, 80*fr*, and the mechanical oil pump 31 is stopped as the internal combustion engine 2 is stopped. Thus, during the EV driving, lubricant is supplied to the lubrication portion of the automatic speed change mechanism 5 by the electric oil pump 32.

As in JP 2010-223399 A, during the EV driving in the forward range of the hybrid vehicle 100, an engagement control unit 49 of the control unit (ECU) 1 described in detail below engages the clutch C-1 in preparation for switching from the EV driving to the hybrid driving, in the case where, e.g., the vehicle speed becomes less than a predetermined vehicle speed and it is determined that the vehicle speed corresponds to any of the first to third forward speeds. The engagement control unit 49 of the control unit (ECU) 1 described below disengages the clutch C-1 in the case where, e.g., the vehicle speed becomes equal to or higher than the predetermined vehicle speed and it is determined that the vehicle speed corresponds to any of the fourth to sixth forward speeds. On the other hand, during the EV driving in the reverse range, the engagement control unit 49 of the control unit (ECU) 1 described in detail below disengages the clutch C-1, but the brake B-2 is automatically engaged (latched) due to the structure of the hydraulic control device 6.

Figure 9:
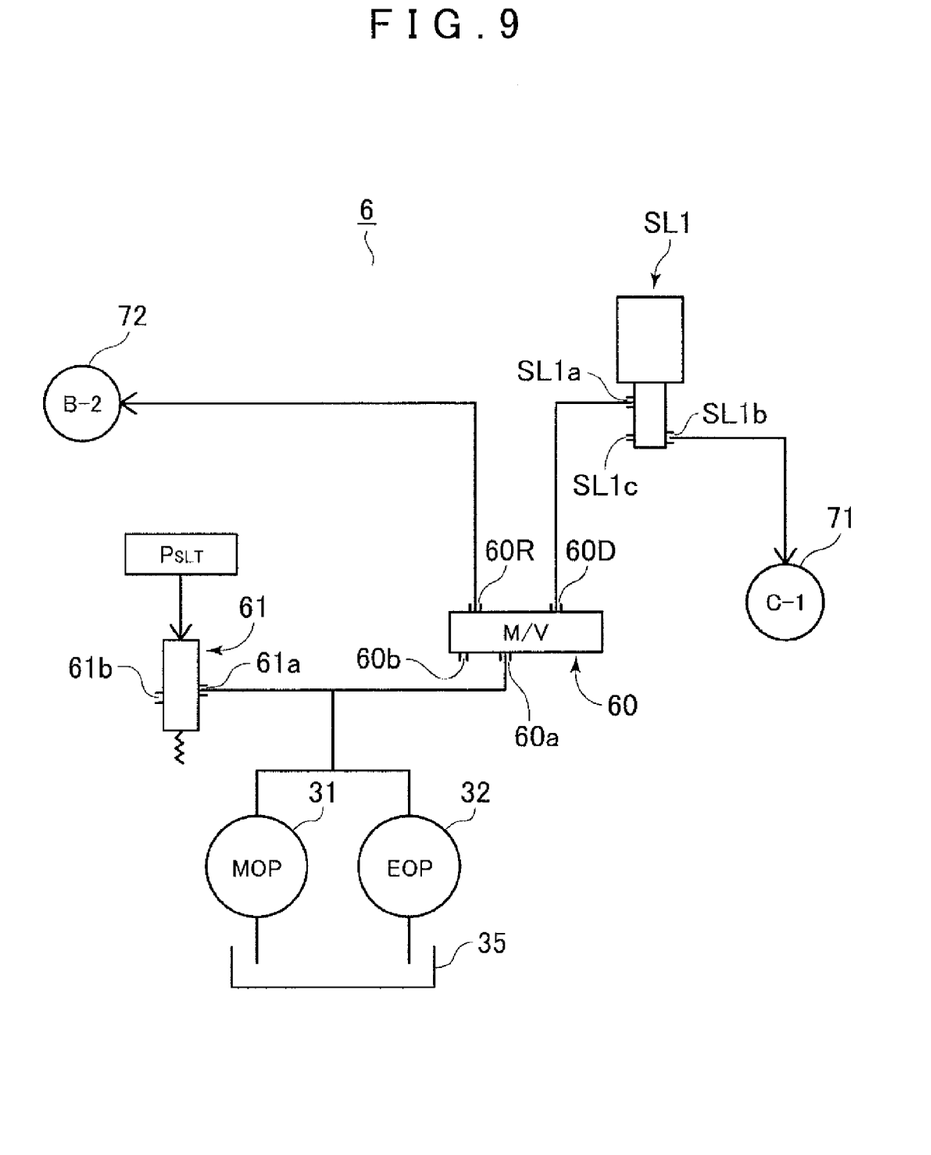
FIG. 9 is a schematic diagram showing a hydraulic circuit in a hydraulic control device of the automatic transmission.

Engagement of the clutch C-1 in the forward range and engagement of the brake B-2 in the reverse range will be described based on the schematic diagram of the hydraulic control device shown in FIG. 9. As shown in FIG. 9, the automatic transmission 10 is provided with the mechanical oil pump (MOP) 31 that is driven together with the internal combustion engine 2 and thus can suck the oil accumulated in an oil pan 35 to generate a hydraulic pressure, and the electric oil pump 32 that is independently driven by an electric motor, not shown, while the internal combustion engine 2 is stopped, as described above, and thus can suck the oil accumulated in the oil pan 35 to generate a hydraulic pressure.

The hydraulic pressure generated by the mechanical oil pump 31 or the electric oil pump 32 is guided to an input port 61*a* of a regulator valve 61 placed in the hydraulic control device 6, and the hydraulic pressure at the input port 61*a* is discharged as appropriate from a discharge port 61*b* according to the magnitude of an SLT pressure $P_{SLT}$ regulated by a linear solenoid valve SLT, not shown, based on, e.g., the throttle opening. The hydraulic pressure is thus regulated as a line pressure $P_L$. The ling pressure $P_L$ is continuously supplied to an input port 60*a* of a manual valve (M/V) 60 while the mechanical oil pump 31 or the electric oil pump 32 is driven.

The manual valve 60 is mechanically or electrically connected to a shift lever provided at a driver's seat, not shown, and is configured so that spool of the manual valve 60 is moved and driven according to the shift position selected with the shift lever. In the forward range, the manual valve 60 outputs the line pressure $P_L$, received at the input port 60*a*, from a forward-range pressure output port 60D as a forward range pressure $P_D$. In the reverse range, the manual valve 60 outputs the line pressure $P_L$, received at the input port 60*a*, from a reverse-range pressure output port 60R as a reverse range pressure $P_R$.

For example, in the forward range in the EV driving mode, drive control of a linear solenoid valve SL1 is performed based on an electric command from the engagement control unit 49 of the control unit 1 described in detail below. Thus, in the linear solenoid valve SL1, the forward range pressure $P_D$ received at an input port SL1*a* from the forward-range pressure output port 60D is regulated while being discharged from a discharge port SL1c, and an engagement pressure $P_{C1}$ thus obtained is output to a hydraulic servo 71 of the clutch C-1 from an output port SL1b. Thus, the clutch C-1 is engaged based on the magnitude of the engagement pressure $P_{C1}$, whereby preparation for quickly forming the first to third forward speeds upon starting of the internal combustion engine 2 is completed.

If the shift range is changed from the forward range to another shift range (reverse range, neutral range, parking range, etc.), drive control of the linear solenoid valve SL1 is performed based on the electric command from the engagement control unit 49 of the control unit 1 described in detail below. Thus, the engagement pressure $P_{C1}$ of the hydraulic servo 71 of the clutch C-1 is discharged from the discharge port SL1c, and the engagement pressure $P_{C1}$ is eventually adjusted to zero pressure, so that the clutch C-1 is disengaged.

On the other hand, for example, in the reverse range in the EV driving mode, the reverse range pressure $P_R$ output from the reverse-range pressure output port 60R is directly supplied to a hydraulic servo 72 of the brake B-2 as an engagement pressure $P_{B2}$. Thus, the brake B-2 is engaged (latched), whereby preparation for quickly forming the reverse speed upon starting of the internal combustion engine 2 is completed. If the shift range is changed from the reverse range to another shift range (forward range, neutral range, parking range, etc.), the engagement pressure $P_{B2}$ of the hydraulic servo 72 of the brake B-2 is discharged from a discharge port 60b of the manual valve 60, and the engagement pressure $P_{B2}$ is eventually adjusted to zero pressure, so that the brake B-2 is disengaged.

In the hydraulic control device 6 having the above structure, if the shift range is quickly changed from the forward range to the reverse range, the reverse range pressure $P_R$ is immediately supplied from the manual valve 60 to the hydraulic servo 72 of the brake B-2. However, the state were the clutch C-1 and the brake B-2 are both engaged and the first forward speed (see FIG. 3) is formed is temporarily created until the engagement pressure $P_{C1}$ of the clutch C-1 is discharged from the hydraulic servo 71 via the discharge port SL1c of the linear solenoid valve SL1.

On the contrary, if the shift range is quickly changed from the reverse range to the forward range, the engagement pressure $P_{C1}$ of the clutch C-1 is immediately supplied to the hydraulic servo 71 via the linear solenoid valve SL1. However, the state where the clutch C-1 and the brake B-2 are both engaged and the first forward speed (see FIG. 3) is formed is temporarily created until the engagement pressure $P_{B2}$ of the brake B-2 is discharged from the discharge port 60b of the manual valve 60.

Even if the state where the first forward speed is formed is temporarily created when the shift range is changed from the forward range to the reverse range or from the reverse range to the forward range as described above, there is no problem in, e.g., the engine driving mode in which the internal combustion engine 2 is used, because of the time lag between stepping-on of the accelerator and driving force output of the internal combustion engine 2. However, in, e.g., the EV driving mode in which the rear motor 20 is used, the rear motor 20 can immediately drive the wheels 80fl, 80fr, 80rl, 80rr according to a shift position change signal, regardless of the engagement state of the clutch C-1 and the brake B-2. Thus, drag may occur in particular in the clutch C-1 or the brake B-2, which is to be disengaged.

Control of suppressing drag of the clutch C-1 and the configuration of the control unit 1 that performs this control will be described below with respect to an example in which the shift range is changed from the forward range to the reverse range as described above, with reference to FIGS. 4 to 8. In the description of the control, the character "A," "B," "C," "X," "Y," etc. is added to the end of the reference characters in order to distinguish between the reference characters with and without the character. The character "A," "B," "C," "X," "Y," etc. is omitted when the reference characters are used as definitions that do not distinguish between the reference characters with and without the character.

Figure 4:
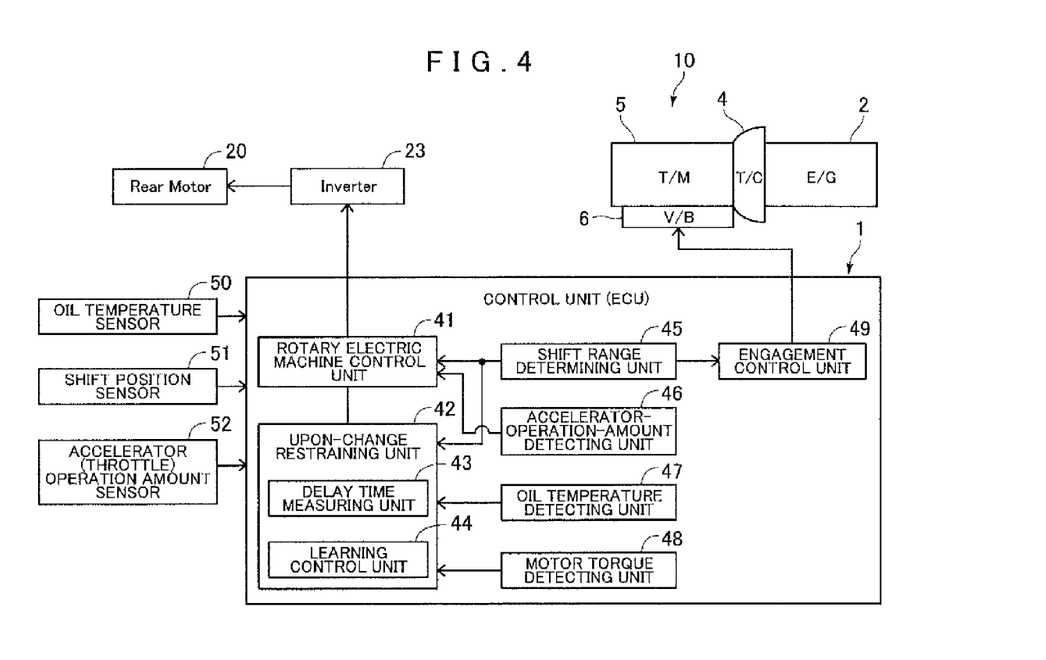
FIG. 4 is a block diagram showing a control device of the hybrid vehicle.

As shown in FIG. 4, the control unit (ECU) 1 includes a rotary electric machine control unit 41, an upon-change restraining unit 42 having a delay time measuring unit 43 and a learning control unit 44, a shift range determining unit 45, an accelerator-operation-amount detecting unit 46, an oil temperature detecting unit 47, a motor torque detecting unit 48, the engagement control unit 49, etc. An oil temperature sensor 50 that is placed in, e.g., the hydraulic control device 6 and detects the oil temperature, a shift position sensor 51 that detects the selected position of the shift lever, not shown, and an accelerator (throttle) operation amount sensor 52 that detects the angle of an accelerator pedal, not shown, are connected to the control unit (ECU) 1.

Figure 5:
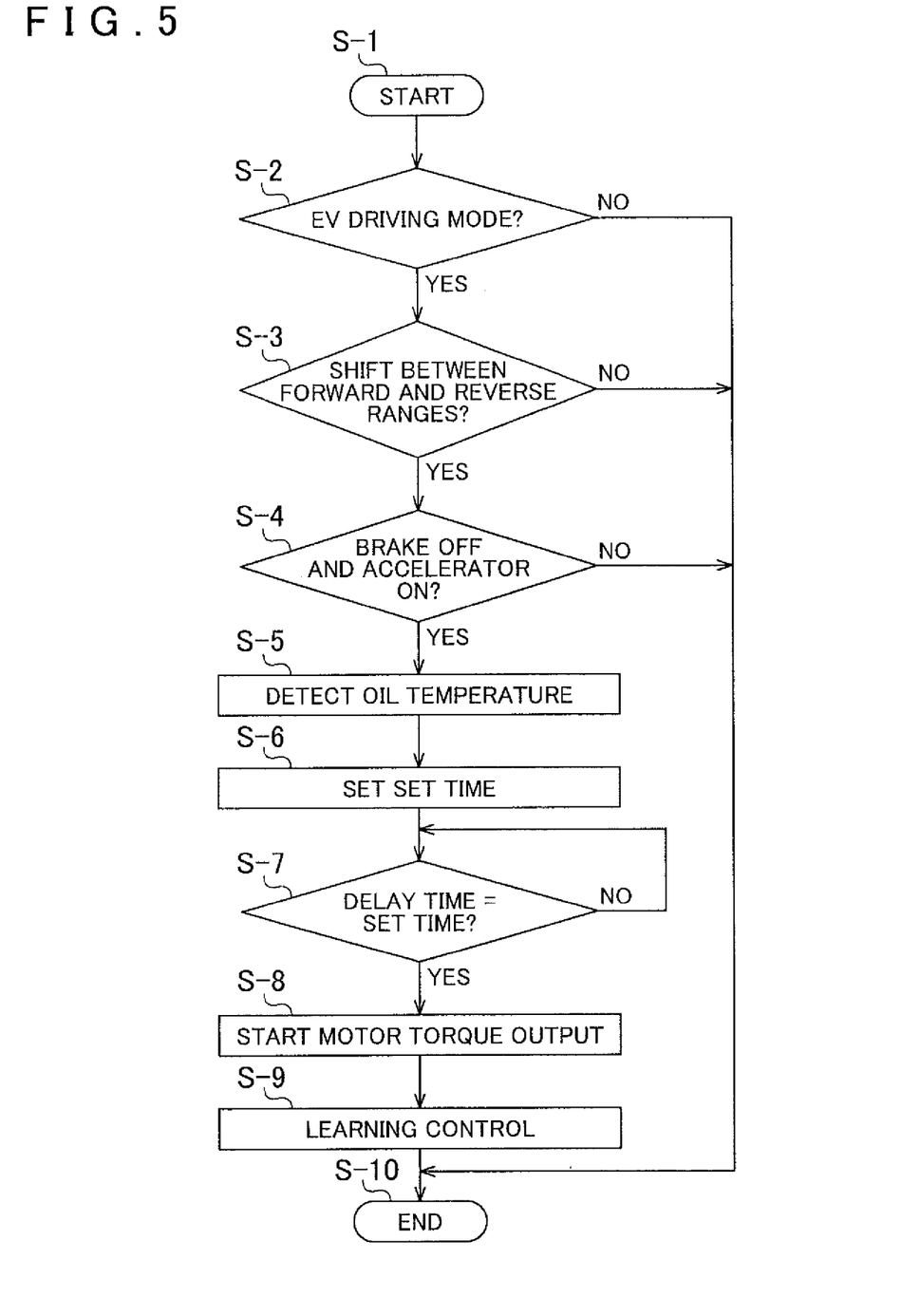
FIG. 5 is a flowchart showing forward-reverse range shift control during EV driving.

As shown in FIG. 5, the control unit 1 starts the drag suppression control when, e.g., an ignition is turned on (S-1). First, it is determined whether the operation mode is an EV driving mode (S-2). If the operation mode is not the EV driving mode (NO in S-2), the control program is terminated because the clutch C-1 is disengaged in time with respect to the response of the driving force output of the internal combustion engine 2 as described above and drag of the clutch C-1 is less likely to occur (S-10). On the other hand, if the operation mode is the EV driving mode (YES in S-2), the control program proceeds to step S-3, where whether a change between forward and reverse ranges has occurred is determined according to the shift range determined by the shift range determining unit 45 based on detection of the shift position sensor 51. If no change between forward and reverse ranges (in this example, shift from forward to reverse) has occurred, the control program is terminated because no drag as described above occurs (S-10).

Figure 6:
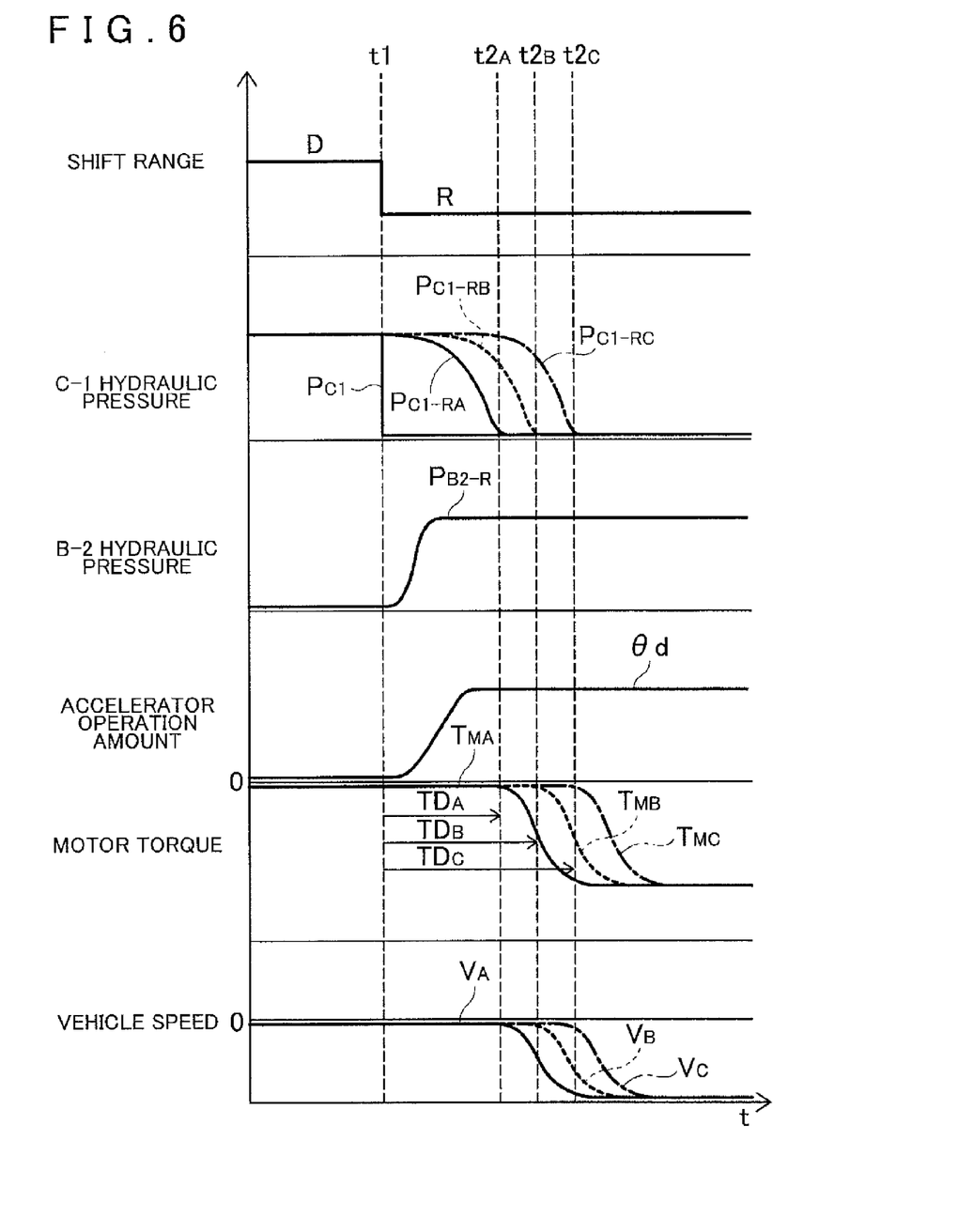
FIG. 6 is a timing chart in the case where the shift range is changed from a forward range to a reverse range.

For example, if the shift range is changed from the forward range (D) to the reverse range (R) at time t1 shown in FIG. 6 (YES in S-3), it is first determined whether a foot brake, not shown, is off and the accelerator is on (S-4). If the foot brake is on and in particular the accelerator is off, the control program is terminated because the rear motor 20 does not start outputting a driving force (S-10).

If the foot brake is off and the accelerator is on (YES in S-4), the rotary electric machine control unit 41 normally commands the inverter 23 to output the driving force of the rear motor 20 according to the accelerator operation amount ($\theta_d$) detected by the accelerator-operation-amount detecting unit 46 based on detection of the accelerator operation amount sensor 52. That is, the rotary electric machine control unit 41 drives the rear motor 20 when the shirt range is the forward range (or reverse range). In the drag suppression control, the upon-change restraining unit 42 restrains driving of the rear motor 20 in a manner described below.

First, the control program proceeds to step S-5, where the oil temperature detecting unit 47 detects the oil temperature of the automatic transmission 10 based on detection of the oil temperature sensor 50. Then, the control program proceeds to step S-6, where the delay time measuring unit 43 sets a set time TD that is longer as the oil temperature is lower.

That is, as shown in FIG. 6, a command is output to control an engagement pressure (command value) $P_{C1}$ of the clutch C-1 to zero pressure at time t1 when the shift range is changed from the forward range to the reverse range. However, since oil viscosity varies depending on the oil temperature, the time it takes for oil to be discharged from the discharge port SL1c varies. Thus, in the case of a high oil temperature, an actual engagement pressure $P_{C1-R}$ of the clutch C-1 reaches zero pressure at time $t2_A$, like an actual engagement pressure $P_{C1-RA}$. In the case of an intermediate oil temperature (lower than the high oil temperature and higher than a low oil temperature), the actual engagement pressure of the clutch C-1 reaches zero pressure at time $t2_B$, like an actual engagement pressure $P_{C1-RB}$. In the case of the low oil temperature, the actual engagement pressure $P_{C1-R}$ of the clutch C-1 reaches zero pressure at time $t2_C$, like an actual engagement pressure $P_{C1-RC}$.

Before the time $t2_A$, $t2_B$, $t2_C$ when the actual engagement pressure $P_{C1-RA}$, $P_{C1-RB}$) $P_{C1-RC}$ reaches zero pressure, a reverse range pressure $P_R$ is output from the manual valve 60, and an actual engagement pressure $P_{B2-R}$ of the brake B-2 increases, whereby the state where the first forward speed is formed is temporarily created.

Accordingly, the delay time measuring unit 43 sets the set time TD that is longer as the oil temperature is lower, like a set time $TD_A$ in the case of the high oil temperature, a set time $TD_B$ in the case of the intermediate oil temperature, and a set time $TD_C$ in the case of the low oil temperature. Although the present embodiment is described with respect to an example in which the three set times $TD_A$, $TD_B$, $TD_C$ are set for the three oil temperature ranges, it is preferable to set the set time TD that varies continuously according to the oil temperature. In this case, the set time TD can be set by, e.g., linearly complementing the three set times $TD_A$, $TD_B$, $TD_C$ according to the oil temperature.

The delay time measuring unit 43 starts a delay timer at time t1 when the shift range is changed to the reverse range. The delay time measuring unit 43 determines whether delay time has reached the set time TD set according to the oil temperature (S-7), and waits until the delay time reaches the set time TD (NO in S-7). If, e.g., the driver steps on the accelerator pedal during this period, the accelerator operation amount θd increases, but the upon-change restraining unit 42 commands the rotary electric machine control unit 41 to restrain (inhibit) the start of driving of the rear motor 20.

Then, when the delay time reaches the set time TD according to the oil temperature (time $t2_A$ to time $t2_C$) (YES in S-7), the upon-change restraining unit 42 commands the rotary electric machine control unit 41 to allow driving of the rear motor 20 to be started (start motor torque output). That is, the upon-change restraining unit 42 removes restraint (inhibition) of motor torque output (S-8).

Thus, in the case of, e.g., the high oil temperature, motor torque (output torque) $T_{MA}$ of the rear motor 20 is output and the hybrid vehicle 100 is started in the reverse direction as shown by a vehicle speed $V_A$ from the time $t2_A$ when the actual engagement pressure $P_{C1-RA}$ of the clutch C-1 decreases to zero pressure (after the clutch C-1 is completely disengaged).

Similarly, in the case of, e.g., the intermediate oil temperature, motor torque (output torque) $T_{MB}$ of the rear motor 20 is output and the hybrid vehicle 100 is started in the reverse direction as shown by a vehicle speed $V_B$ from the time $t2_B$ when the actual engagement pressure $P_{C1-RB}$ of the clutch C-1 decreases to zero pressure (after the clutch C-1 is completely disengaged).

Similarly, in the case of, e.g., the low oil temperature, motor torque (output torque) $T_{MC}$ of the rear motor 20 is output and the hybrid vehicle 100 is started in the reverse direction as shown by a vehicle speed $V_C$ from the time $t2_C$ when the actual engagement pressure $P_{C1-RC}$ of the clutch C-1 decreases to zero pressure (after the clutch C-1 is completely disengaged).

Figure 7:
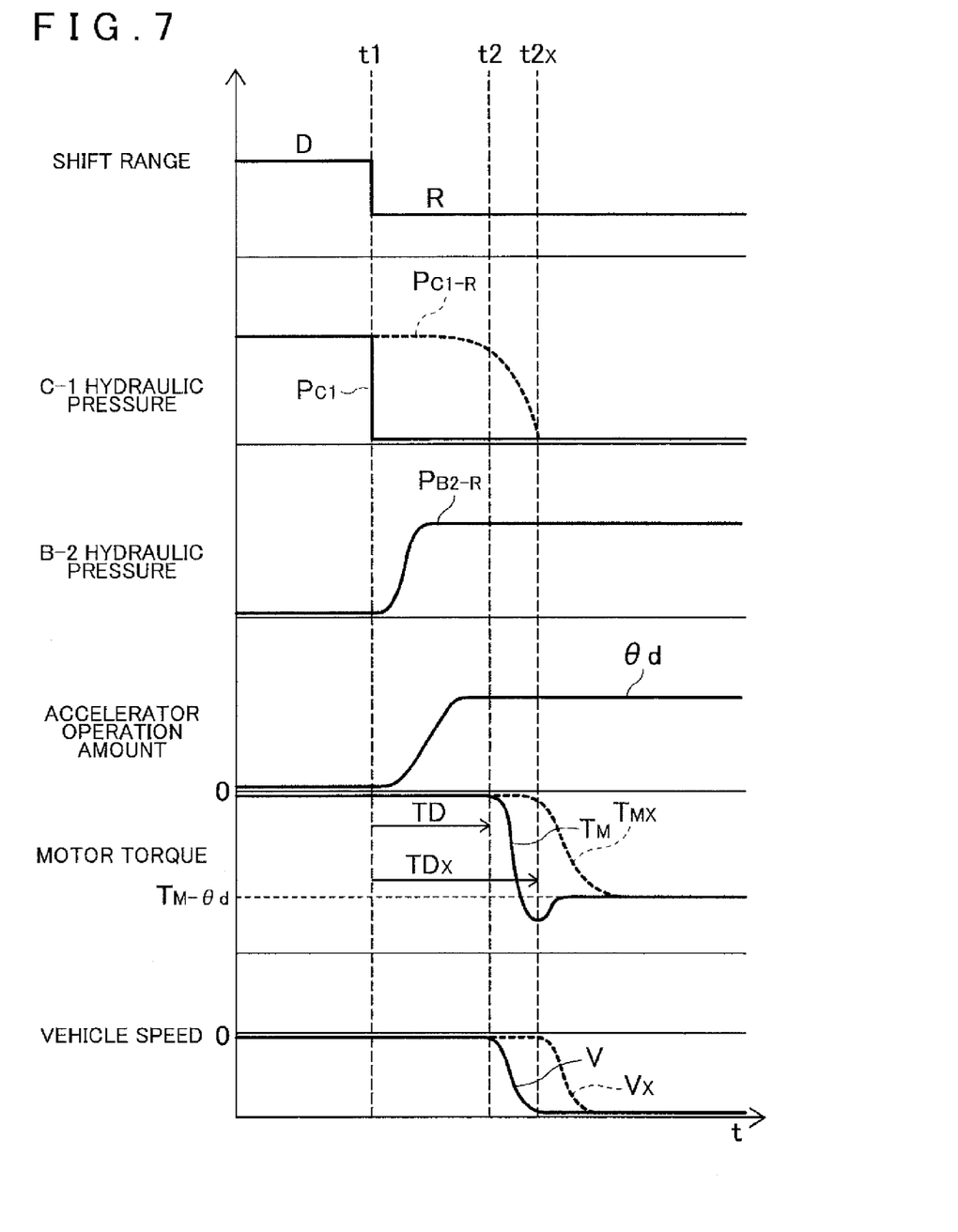
FIG. 7 is a timing chart showing learning of a delay timer in the case where the shift range is changed from the forward range to the reverse range.
Figure 8:
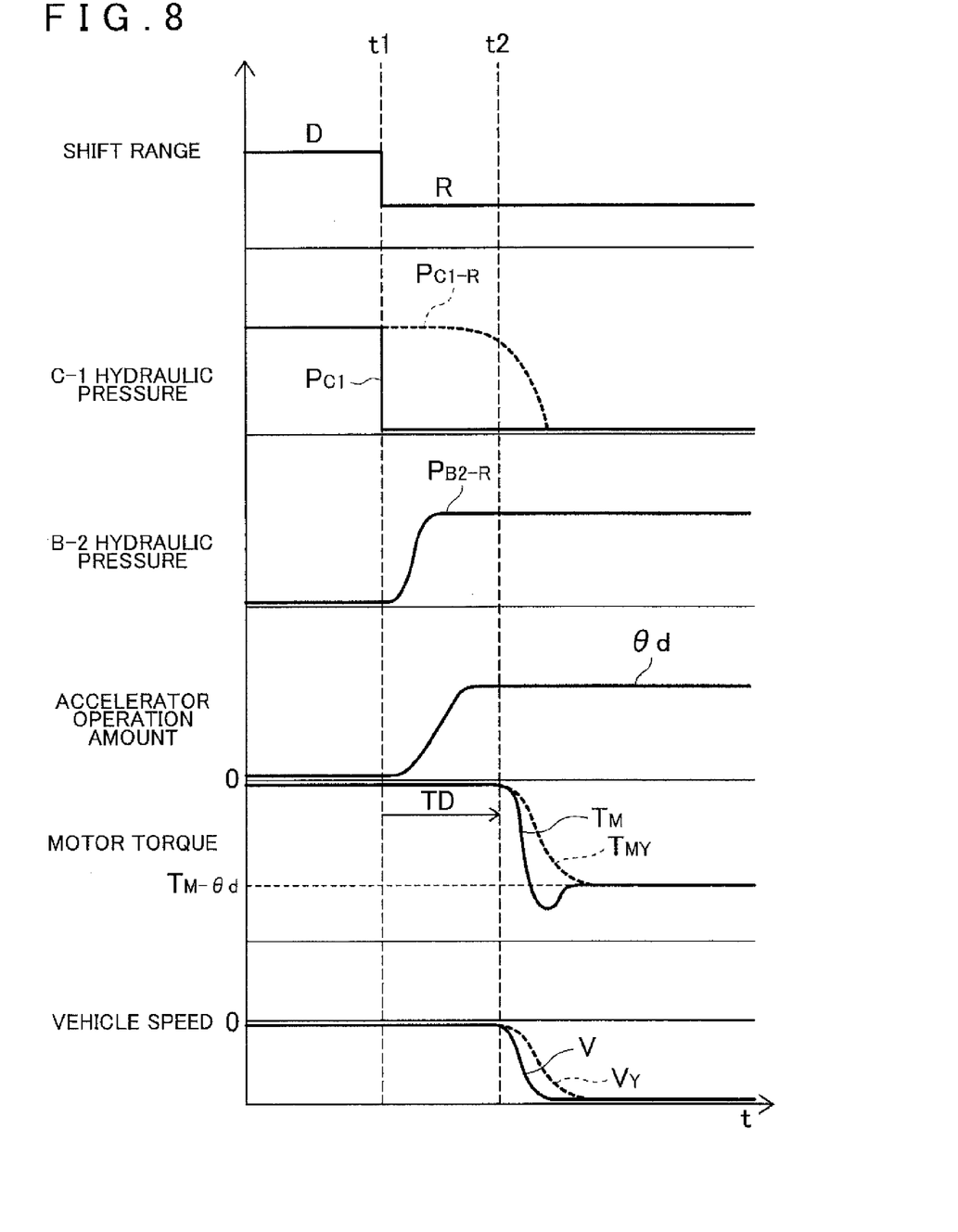
FIG. 8 is a timing chart showing learning of motor torque in the case where the shift range is changed from the forward range to the reverse range.

If the set time TD is set as described above and the delay time reaches the set time TD, the upon-change restraining unit 42 commands the rotary electric machine control unit 41 to allow driving of the rear motor 20 to be started. However, as shown in FIGS. 7 and 8, reduction in actual engagement pressure $P_{C1-R}$ may be delayed with respect to the set time TD due to a manufacturing error, etc. Accordingly, in this control, the learning control unit 44 performs learning control in step S-9 so that the control can properly performed next time. This learning control has two methods, which will be separately described below with reference to FIGS. 7 and 8.

First, in the learning control shown in FIG. 7, if the operation mode is the EV driving mode and the shift range is changed from the forward range to the reverse range at time t1, the set time TD is set, and output of the motor torque $T_M$ of the rear motor 20 is allowed to be started at time t2. However, at time t2, the actual engagement pressure $P_{C1-R}$ has not decreased, and the clutch C-1 is still dragging.

In this case, since the rotary electric machine control unit 41 performs rotational speed control at the start of driving of the rear motor 20 until the rear motor 20 reaches a predetermined rotational speed (predetermined vehicle speed) (because performing torque control of the rear motor 20 upon starting of the vehicle cannot satisfactorily control the vehicle speed in the case where, e.g., the wheels ride over a stepped portion when the vehicle is started), the hybrid vehicle 100 is started with the clutch C-1 dragging so that the vehicle speed V increases. Accordingly, the output motor torque $T_M$ is larger than normal motor torque $T_{M-\theta d}$ according to the accelerator operation amount θd by an amount corresponding to the drag of the clutch C-1.

In this rotational speed control, the degree to which the motor torque (the output torque of the rotary electric machine) increases (increase gradient) is preset, and the rotational speed is controlled so that an increase gradient gentler than the preset degree of increase (increase gradient).

The learning control unit 44 monitors the degree to which the motor torque (the output torque of the rotary electric machine) $T_M$ increases after the elapse of the set time TD by the motor torque detecting unit 48 based on, e.g., the voltage value that is output from the inverter 23. As a result of monitoring the degree to which the motor torque $T_M$ increases after the elapse of the set time TD, if the motor torque $T_M$ becomes larger than the motor torque $T_{M-\theta d}$ according to the accelerator operation amount θd, the control program learns to set the set time $TD_X$ the next time the control is performed, so that the set time $TD_X$ is longer than the set time TD in this control by a predetermined rate (e.g., 10%).

Thus, the next time the drag suppression control is performed, the set time $TD_X$ is set as the set time TD in step S-6, and output of the motor torque is started at time $t2_X$ instead of time t2. That is, as shown by a vehicle speed $V_X$, start of the hybrid vehicle 100 is delayed, and the control program learns to prevent drag of the clutch C-1. Even if drag of the clutch C-1 cannot be prevented by, e.g., a single learning cycle, drag of the clutch C-1 can be eventually prevented by repeatedly performing the learning.

As another learning control method, in the case of the learning control shown in FIG. 8, as in the case of FIG. 7, if the operation mode is the EV driving mode and the shift range is changed from the forward range to the reverse range at time t1, the set time TD is set, and output of the motor torque $T_M$ of the rear motor 20 is allowed to be started at time t2. However, at time t2, the actual engagement pressure $P_{C1-R}$ has not decreased, and the clutch C-1 is still dragging.

In this case, since the rotary electric machine control unit 41 similarly performs rotational speed control of the rear motor 20, the hybrid vehicle 100 is started with the clutch C-1 dragging so that the vehicle speed V increases. Accordingly, the output motor torque $T_M$ is larger than the normal motor torque $T_{M\text{-}\theta d}$ according to the accelerator operation amount θd by an amount corresponding to the drag of the clutch C-1.

The learning control unit 44 monitors the degree to which the motor torque (the output torque of the rotary electric machine) $T_M$ increases after the elapse of the set time TD by the motor torque detecting unit 48 based on, e.g., the voltage value that is output from the inverter 23. As a result of monitoring the degree to which the motor torque $T_M$ increases after the elapse of the set time TD, if the motor torque $T_M$ becomes larger than the motor torque $T_{M\text{-}\theta d}$ according to the accelerator operation amount θd, the control program learns to suppress the degree to which the motor torque (the output torque of the rotary electric machine in the next control) $T_{MY}$ that is output the next time the control is performed increases (increase gradient) so that this degree is reduced by a predetermined rate (e.g., 10%) from the motor torque $T_M$ output in this control.

Thus, the next time the drag suppression control is performed, the degree to which the motor torque $T_{MY}$ increases is reduced when output of the motor torque $T_{MY}$ is started in step S-8. Accordingly, as shown by a vehicle speed $V_y$, the hybrid vehicle 100 is gently accelerated upon starting, and the motor torque $T_{MY}$ does not become large until the actual engagement pressure $P_{Ct-R}$ of the clutch C-1 decreases, which provides more time. Thus, the control program learns to prevent drag of the clutch C-1. Similarly, even if drag of the clutch C-1 cannot be prevented by, e.g., a single learning cycle, drag of the clutch C-1 can be eventually prevented by repeatedly performing the learning.

As described above, after the learning control shown in FIG. 7 or 8 is performed (S-9), a single cycle of the drag suppression control (i.e., single start) as described above is terminated (S-10).

As described above, according to the control unit 1 of the hybrid vehicle 100, the upon-change restraining unit 42 restrains the start of driving of the rear motor 20 by the rotary electric machine control unit 41 for the set time TD after the shift range is shifted from the forward range to the reverse range while the internal combustion engine 2 is stopped (i.e., the EV driving mode). This can prevent particularly drag of the clutch C-1 to be disengaged when the shift range is changed from the forward range to the reverse range, whereby durability of the clutch C-1 can be improved.

The upon-change restraining unit 42 increases the set time TD during which the start of driving of the rear motor 20 is restrained, as the oil temperature is lower. This allows driving of the rear motor 20 to be started at appropriate timing according to the oil temperature. Accordingly, particularly when the oil temperature is low, drag of the clutch C-1 can be prevented even if disengagement of the clutch C-1 is delayed due to oil viscosity. When the oil temperature is high, the clutch C-1 is disengaged earlier, and thus starting of the vehicle is prevented from being restrained for an unnecessarily long time, which can reduce discomfort to the driver.

Moreover, the upon-change restraining unit 42 learns the length of the set time TD for the next control, based on the degree to which the motor torque $T_M$ increases after the elapse of the set time TD during which the start of driving of the rear motor 20 is restrained. Accordingly, particularly when the motor torque $T_M$ becomes higher than that in the normal state due to drag of the clutch C-1, the set time TD for the next control is increased, and drag of the clutch C-1 can be prevented in the next control.

As another learning control method, the upon-change restraining unit 42 learns to suppress the degree to which the motor torque $T_{MY}$ increases in the next control, based on the degree to which the motor torque $T_M$ increases after the elapse of the set time TD. Accordingly, particularly when the motor torque $T_M$ becomes higher than that in the normal state due to drag of the clutch C-1, the degree to which the motor torque $T_{MY}$ increases after the elapse of the set time TD in the next control is reduced, and drag of the clutch C-1 can be reduced in the next control.

The rotary electric machine control unit 41 usually controls driving of the rear motor 20 based on the accelerator operation amount θd. Accordingly, if the shift range is changed from the forward range to the reverse range and the accelerator is on, the rotary electric machine control unit 41 attempts to drive the rear motor 20 according to the accelerator operation amount θd. However, since the upon-change restraining unit 42 restrains the start of driving of the rear motor 20 by the rotary electric machine control unit 41 regardless of the accelerator operation amount θd, drag of the clutch C-1 can be prevented when the shift range is changed from the forward range to the reverse range.

The present embodiment is described above with respect to an example in which reduction in actual engagement pressure $P_{C1-R}$ of the clutch C-1 is delayed with respect to the start of driving of the rear motor 20 when the shift range is changed from the forward range to the reverse range. However, there is also a case where reduction in actual engagement pressure $P_{B2-R}$ of the brake B-2 is delayed with respect to the start of driving of the rear motor 20 when the shift range is changed from the reverse range to the forward range. It should be understood that in this case as well, drag of the brake B-2 can be prevented by restraining the start of driving of the rear motor 20 in a manner similar to that described above.

The present embodiment is described with respect to the case where after the shift range is changed between the forward and reverse ranges, the accelerator is on and the rear motor 20 is driven, whereby drag of the clutch C-1 or the brake B-2 is caused. However, not only in the case where the accelerator is on, but also in the case where, e.g., creep torque is output by a motor after the shift range is changed between the forward and reverse ranges, drag of the clutch C-1 or the brake B-2 may occur similarly. Thus, the present invention can be similarly applied to the latter case as well.

The present embodiment is described with respect to an example in which the automatic transmission 10 is applied to the rear motor hybrid vehicle 100. However, the present invention is not limited to this, and the present invention can be applied to any hybrid vehicle that is provided with an automatic transmission engaging the first friction engagement element in the forward range and engaging the second friction engagement element in the reverse range, and that is started with a driving force of a motor when the shift range is changed between the forward and reverse ranges in the EV driving mode. It should be understood that the term "hybrid vehicle" is used as a concept including plug-in hybrid vehicles that can achieve EV driving by charging.

The present embodiment is described with respect to the vehicle including the rear motor 20 as a rotary electric machine that is driven in the EV driving mode. However, the present invention is not limited to this, and the present invention can also be applied to a vehicle that includes, e.g., a wheel motor in a wheel so as to be started by the wheel motor.

The present embodiment is described with respect to an example in which the automatic transmission 10 is a multi-stage automatic transmission that attains six forward speeds and a reverse speed. However, the present invention is not limited to this, and can also be applied to, e.g., multi-stage transmissions that attain seven or more forward speeds or five or more forward speeds.

The control device of the hybrid vehicle according to the present invention can be used for vehicles such as a passenger car and a truck, and is preferably used particularly for vehicles that are required to prevent drag of a friction engagement element when the shift range is changed from the forward range to the reverse range or from the reverse range to the forward range while an internal combustion engine is stopped.

What is claimed is:

1. A control device of a hybrid vehicle, comprising:
    an internal combustion engine;
    an automatic transmission placed on a power transmission path between the internal combustion engine and first wheels, having a first friction engagement element which is engaged in a forward range and a second engagement element which is engaged in a reverse range based on a hydraulic pressure generated by an electric oil pump that is driven while the internal combustion engine is stopped, and forming a predetermined shift speed when the first and second friction engagement elements are simultaneously engaged;
    a rotary electric machine capable of driving second wheels without using the power transmission path; and
    an electronic control unit that is configured to:
        determine a shift range;
        drive the rotary electric machine when the shift range is the forward range or the reverse range while the internal combustion engine is stopped; and
        restrain driving of the rotary electric machine until a set time after the shift range is changed from the forward range to the reverse range or from the reverse range to the forward range while the internal combustion engine is stopped,
    wherein the set time is when the first friction engagement element is completely disengaged in a case in which the shift range is changed from the forward range to the reverse range, or when the second friction engagement element is completely disengaged in a case in which the shift range is chanced from the reverse range to the forward range.

2. The control device of the hybrid vehicle according to claim 1, wherein
    the electronic control unit is further configured to:
    detect an oil temperature in the automatic transmission, and
    increase the set time as the oil temperature is lower.

3. The control device of the hybrid vehicle according to claim 2, wherein
    the electronic control unit performs rotational speed control until at least a predetermined rotational speed is obtained at a start of driving of the rotary electric machine, and
    the electronic control unit learns a length of the set time for a next control, based on a degree to which output torque of the rotary electric machine increases after the set time.

4. The control device of the hybrid vehicle according to claim 2, wherein
    the electronic control unit performs rotational speed control until at least a predetermined rotational speed is obtained at a start of driving of the rotary electric machine, and
    the electronic control unit learns to suppress a degree to which output torque of the rotary electric machine increases in a next control, based on a degree to which the output torque of the rotary electric machine increases after the set time.

5. The control device of the hybrid vehicle according to claim 2, wherein the electronic control unit is further configured to:
    detect an accelerator operation amount,
    control driving of the rotary electric machine based on the accelerator operation amount, and
    restrain a start of driving of the rotary electric machine regardless of the accelerator operation amount.

6. The control device of the hybrid vehicle according to claim 1, wherein
    the electronic control unit performs rotational speed control until at least a predetermined rotational speed is obtained at a start of driving of the rotary electric machine, and
    the electronic control unit learns a length of the set time for a next control, based on a degree to which output torque of the rotary electric machine increases after the set time.

7. The control device of the hybrid vehicle according to claim 6, wherein the electronic control unit is further configured to:
    detect an accelerator operation amount,
    control driving of the rotary electric machine based on the accelerator operation amount, and
    restrain the start of driving of the rotary electric machine regardless of the accelerator operation amount.

8. The control device of the hybrid vehicle according to claim 1, wherein
    the electronic control unit performs rotational speed control until at least a predetermined rotational speed is obtained at a start of driving of the rotary electric machine, and
    the electronic control unit learns to suppress a degree to which output torque of the rotary electric machine increases in a next control, based on a degree to which the output torque of the rotary electric machine increases after the set time.

9. The control device of the hybrid vehicle according to claim 8, wherein the electronic control unit is further configured to:
    detect an accelerator operation amount,
    control driving of the rotary electric machine based on the accelerator operation amount, and
    restrain the start of driving of the rotary electric machine regardless of the accelerator operation amount.

10. The control device of the hybrid vehicle according to claim 1, wherein the electronic control unit is further configured to:
    detect an accelerator operation amount,
    control driving of the rotary electric machine based on the accelerator operation amount, and
    restrain a start of driving of the rotary electric machine regardless of the accelerator operation amount.

* * * * *